(12) United States Patent
Falcoz

(10) Patent No.: US 8,064,489 B2
(45) Date of Patent: Nov. 22, 2011

(54) SPECTRAL SPREADING AND CONTROL DEVICE FOR HIGH PEAK POWER PULSE LASERS

(75) Inventor: Franck Falcoz, Dourdan (FR)

(73) Assignee: Thales (FR)

( * ) Notice: Subject to any disclaimer, the term of this patent is extended or adjusted under 35 U.S.C. 154(b) by 0 days.

(21) Appl. No.: 12/373,034

(22) PCT Filed: Jul. 11, 2007

(86) PCT No.: PCT/EP2007/057128
§ 371 (c)(1),
(2), (4) Date: Oct. 13, 2009

(87) PCT Pub. No.: WO2008/006863
PCT Pub. Date: Jan. 17, 2008

(65) Prior Publication Data
US 2010/0040096 A1    Feb. 18, 2010

(30) Foreign Application Priority Data
Jul. 11, 2006   (FR) ...................................... 06 06309

(51) Int. Cl.
*H01S 3/117* (2006.01)
*H01S 3/10* (2006.01)
(52) U.S. Cl. ................. 372/13; 372/25; 372/26
(58) Field of Classification Search ............ 372/13, 372/25, 26; 359/286
See application file for complete search history.

(56) References Cited

U.S. PATENT DOCUMENTS
2007/0098025 A1 *   5/2007   Hong et al. ..................... 372/13

FOREIGN PATENT DOCUMENTS
| FR | 2834080 | 6/2003 |
| FR | 2852155 | 9/2004 |
| WO | WO03/055015 | 7/2003 |

OTHER PUBLICATIONS

Pittman, M. et al., "Near Diffraction Limited 100 TW-10 Hz Femtosecond Laser Now Approaches Towards Ultra-High Intensities", Conference on Lasers and Electro-Optics, (CLEO 2001), Technical Digest, Postconference Edition, Baltimore, MD, May 6-11, 2001, Trends in Optics and Photonics, (TOPS), US, Washington, WA: OSA, US, vol. 56, May 6, 2001, pages.*

Pittman, M. et al., "Near Diffraction Limited 100 TW-10 Hz Ferntosecond Laser Now Approaches Towards Ultra-High Intensities", Conference on Lasers and Electro-Optics, (CLEO 2001), Technical Digest, Postconference Edition, Baltimore, MD, May 6-11, 2001, Trends in Optics and Photonics, (TOPS), US, Washington, WA: OSAa, US, vol. 56, May 6, 2001, pp. 72-73, XP010559571, ISBN: 1-55752-662-1.

(Continued)

*Primary Examiner* — Armando Rodriguez
(74) *Attorney, Agent, or Firm* — Lowe Hauptman Ham & Berner, LLP

(57) ABSTRACT

The present invention relates to a spectral stretching and control device for high peak power pulse lasers, which does not limit the extraction efficiency of the amplifiers in the CPA chain into which said device can be inserted, and it is characterized in that it comprises an acousto-optical device for dispersing light pulses, which is programmable in terms of spectral amplitude, disposed in a multi-pass amplifier.

6 Claims, 4 Drawing Sheets

OTHER PUBLICATIONS

Zhiyi, Wei et al. "Optimized Design and Construction of 100TW TI: Sapphire Laser Toward to Phase Controlling, Spectrum Shaping and Wave-Front Correction," LEOS, 2005, IEEE Annual Meeting Conference Proceedings Sydney, Australia, Oct. 23-27, 2005, Piscataway, NJ, USA, IEEE, Oct. 23, 2005, pp. 619-620, XP010886708, ISBN: 0-7803-9217-5.

Cheriaux, G. et al. "Aberration-Free Stretcher Design for Ulstrashort-Pulse Amplification," Optics Letters, OSA, Optical Society of American, Washington, DC, US, vol. 21, No. 6, Mar. 15, 1996, pp. 414-416, XP000587037, ISSN: 0146-9592.

Database Compendex [Online], Engineering Information, Inc., New York, NY, US; 1998, Le Blanc, S. P. et al., "Femtosecond Pulse Stretcher Based on a Modified Offner Triplet," XP002426860, Database accession No. EIX98414340235, Conf. Lasers Electrop Opt Eur Tech Dig; Conference on Lasers and Electro-Optics Europe—Technical Digest 1998 IEEE, Piscataway, NJ, USA, 1998, pp. 280-281.

Database Compendex [Online], Engineering Information, Inc., New York, NY, US; 1998, Dorrer, C. et al., "Characterization of a Femtosecond kHz Amplifier Chain by Spectral Shearing Interferometry," XP00246861, Database accession No. EIX98414340552, Conf. Lasers Electrop Opt Eur Tech Dig; Conference on Lasers and Electro-Optics Europe—Technical Digest 1998 IEEE, Piscataway, NJ, USA, 1998, pp. 517-518.

\* cited by examiner

SPECTRAL SPREADING AND CONTROL DEVICE FOR HIGH PEAK POWER PULSE LASERS

CROSS-REFERENCE TO RELATED APPLICATIONS

The present Application is based on International Application No. PCT/EP2007/057128, filed on Jul. 11, 2007, which in turn corresponds to French Application No., 0606309, filed on Jul. 11, 2006, and priority is hereby claimed under 35 USC §119 based on these applications. Each of these applications are hereby incorporated by reference in their entirety into the present application.

BACKGROUND OF THE INVENTION

1. Filed of the Invention

The present invention pertains to a spectral stretching and control device for high peak power pulse lasers, as well as to a frequency-drift amplification chain comprising such a spectral stretching and control device.

2. Description of Related Art

The production of pulse lasers, of titanium-doped sapphire type (Ti:Sa), with very high peak power makes it necessary to control very wide spectra so as to decrease the pulse durations on output from the amplifying chain.

Two phenomena greatly limit the production of lasers of this type. The first is of a practical nature and relates to the significant bulkiness of the temporal stretching devices (Öffner type stretcher) making it possible to pass the spectral band. The second is of a physical nature and involves the spectral constriction and shift occurring in the amplifying medium.

A conventional solution for replacing the Öffner stretcher is to use an optical fiber, but recompression is made difficult because of significant spectral aberrations. As regards spectral constriction, the most commonly used solution consists in pre-compensating, at the start of the chain (before the so-called regenerative or multi-pass amplifier), the spectral deformation. This filtering-based solution has the drawback of limiting the extraction efficiency of the amplifiers and is all the less effective the larger the number of passes through the amplifiers.

Currently, lasers providing very high peak powers (of the order of a terawatt or more) for very brief times (of the order of a few fs) are of the frequency-drift amplification type (termed CPA, i.e.: Chirped Pulse Amplification). These lasers are based on the use of a wide spectrum, pulse stretching, amplification and recompression of the pulses thus stretched. Typically, these lasers are Ti:Sa chains which have an oscillator spectrum of from 5 to 100 nm, for compressed pulse durations of from 150 to 10 fs. The ability of an amplification chain to maintain a correct spectrum directly influences the ability of the laser to work with short pulses. The spectral constriction induced by the amplifiers is therefore a key factor for obtaining short-duration performance. Likewise, large deformation of the spectrum, for example asymmetric, will disturb the temporal shape and impair the operation of the laser.

The solution commonly used to temporally stretch the pulses before amplification is based on the Öffner stretcher. Its configuration is well known and makes it possible notably to minimize the spectral aberrations (see for example: G. Chériaux, P. Rousseau, F. Salin, J.-P. Chambaret, B. Walker, L. F. Dimauro: "Aberration free stretcher Design for ultrashort pulse amplification" Opt. Lett 21, 414-1996). The main limitation resides in the fact that, to stretch wide spectra, it is necessary to use optics of large dimensions. Even though solutions exist for limiting the bulkiness of this optical system (see French patent 2 834 080), these solutions are not entirely satisfactory. Specifically, the proposed solutions consist in working on the −1 order of the grating. It is thus possible to decrease the bulkiness of the stretcher for constant stretch. Öffner stretchers are nevertheless bulky and require precise alignment of the angles and length of the afocal setup (distance between concave and convex mirror of the afocal setup). Modification of a parameter of the stretcher acts moreover directly on the way in which the pulse will be recompressed.

In an Öffner stretcher, the pulse duration obtained at output depends on the parameters of the stretcher (focal length of the mirrors, number of lines of the gratings, angle of incidence) but especially on the spectral width of the pulse that is to be stretched. A parameter called the stretching factor and expressed in ps/nm is generally defined. This factor can vary from a few units, to a few tens. For an incident pulse of 100 nm, a stretching factor of 2 to 3 is sufficient to amplify the pulse to several hundred mJ. A smaller factor can be applied if the amplification is in the region of an mJ.

In CPA chains, the amplifiers used are of the type with n passes of the beam through the amplifying medium. When n is small (less than 10) the geometric multi-pass configuration is generally used. The pump laser dispatches a pulse into the crystal and the pulse beam to be amplified is thereafter dispatched into an amplifier stage in which it performs n passes through the laser crystal so as to optimize the extraction in terms of energy. FIG. 1 diagrammatically depicts a multi-pass amplifier of this kind, which essentially comprises a crystal 1 (for example Ti:Sa) receiving, from an input mirror ME, input pulses at an angle differing from the normal to its incidence surface, and several reflecting mirrors M1 to M7 disposed on either side of the crystal 1 so as to cause the beam to pass through the crystal at various angles of incidence, the last mirror M7 reflecting this beam to the output via an output mirror MS.

When a large amplification factor is sought, it is necessary to increase the number of passes and the configuration of FIG. 1 is no longer applicable. The configuration generally used is then the regenerative amplifier, an exemplary embodiment of which is shown diagrammatically in FIG. 2. This type of amplifier makes it possible to readily achieve some thirty or so passes.

The system represented in FIG. 2 comprises a crystal 2 disposed, with a Pockels cell 3, in an optical cavity closed by two mirrors 4, 5 and pumped by a pump 6. A polarizer 7, disposed in the cavity, makes it possible to tap off a part of the intra-cavity beam, the tapped-off beam passing through a half-wave plate 8, a reflecting mirror 9 and a Faraday rotator 10 at the output of which a semi-transparent mirror 11 reflects it back towards the use (beam $E_{out}$). Moreover, the polarizer 7 makes it possible to inject an external beam $E_{in}$ into this cavity.

In both cases (FIGS. 1 and 2), the gain of the amplifier may be written:

$$E_{OUT} = J_{SAT}.S.\ln\left(\frac{J_{STO}}{J_{SAT}}\left(e^{\frac{E_{in}}{SJ_{SAT}}} - 1\right) + 1\right)$$

$J_{STO}$ being the stored fluence available for the gain in the medium (the crystal) and $J_{SAT}$ the saturation fluence of this medium. This is the classical equation from the theory of Frantz and Nodvick.

The table below contains a few examples of values of $J_{SAT}$ for various laser materials:

| Materials | $J_{sat}$ in J/cm² | Spectral range |
|---|---|---|
| Dyes | ~0.001 J/cm² | Visible |
| Excimers | ~0.001 J/cm² | UV |
| Nd: YAG | 0.5 J/cm² | 1064 nm |
| Ti: Al₂O₃ | 1.1 J/cm² | 800 nm |
| Nd: Glass | 5 J/cm² | 1054 nm |
| Alexandrite | 22 J/cm² | 750 nm |
| Cr: LiSAF | 5 J/cm² | 830 nm |

In the small-signal regime, with $J_{IN} \ll J_{SAT}$, the gain relation can be approximated with:

$$G = \frac{E_{OUT}}{E_{IN}} = e^{\left(\frac{J_{STO}}{J_{SAT}}\right)}$$

The shape of the gain curve of the above-described amplifiers being close to a Gaussian, on each pass through the medium, a constriction of the spectrum due simply to the gain will be observed.

The curve of FIG. 3 shows a typical exemplary gain in a Ti:Sa crystal as a function of wavelength, this curve being centered on the wavelength of 800 nm.

As a result of the amplification in this laser medium, a gain which is non-uniform as a function of wavelength will therefore be applied to an input signal of limited spectrum, the effect of which is to cause an alteration: the spectral constriction. The example of FIG. 4 illustrates this effect, which is accentuated with the number of passes through the amplifier. The curve of the input signal as a function of its wavelength and the curves of the signal after 4, 10 and 30 passes through the crystal, respectively, have been represented in this FIG. 4. The effect becomes very significant when considering the case of a regenerative amplifier (30 passes for example).

It will be noted that when the input signal possesses a spectrum that is non-centered with respect to the maximum of gain of the medium, the spectral constriction is accompanied by a shift effect which tends to return the signal to the maximum gain spike.

To compensate for these effects, a pre-distortion of the input signal is usable by active or passive filtering at the price of a decrease in the efficiency of the laser. Indeed, the filters used have efficiencies of the order of 50% since they act (cut off) spectrally at the energy maximum.

SUMMARY OF THE INVENTION

One object of the present invention is a spectral stretching and control device for pulse lasers with high peak power, as well as a frequency-drift amplification chain comprising such a spectral stretching and control device, which device does not limit the energy extraction efficiency of the amplifiers and which is as effective as possible.

The stretching device in accordance with the invention is characterized in that it comprises an acousto-optical device for dispersing light pulses, which is programmable in terms of spectral amplitude, disposed in a multi-pass amplifier, advantageously a regenerative amplifier. Thus, the device of the invention exhibits the advantage of amalgamating the function of temporal stretching and control of the spectral amplitude.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

The invention uses an acousto-optical system which, optically, behaves as a dispersive element (similar to a row of prisms) and which moreover makes it possible, via the acoustic wave, to modulate the spectral amplitude of the optical wave. This system is used in a multi-pass configuration and therefore makes it possible, as the pulse propagates through the amplifying medium (crystal 2), to stretch the pulse and to compensate for the spectral constriction for each pass. The amplifying chain can then be greatly simplified according to the diagram of FIG. 5.

The CPA amplifying chain of FIG. 5 comprises: an amplifier device 12, incorporating an acousto-optical device and described in greater detail below with reference to FIG. 6, one or more conventional optical amplifiers 13 and a compression device 14, also conventional.

To better highlight the advantageous characteristics of the invention, an exemplary embodiment is given here. A femtosecond pulse possessing a spectral band of 100 nm centered at 800 nm is considered. When this pulse crosses the acousto-optical device used by the invention, it undergoes a stretch of the order of 4.5 ps with each pass through the crystal. When this acousto-optical device is inserted into a regenerative amplifier, as indicated in FIG. 5, in tandem with the passes, the injected pulse will see its energy amplified and simultaneously its duration stretched. After 40 passes for example (20 return trips), the stretched duration is close to 200 ps and the energy extracted from the regenerative amplifier is of the order of an mJ. Depending on the amplitude of the acoustic wave applied to the acousto-optical device, the spectral amplitude can be modulated at leisure so as to compensate for the spectral constriction of the amplifier, or indeed pre-compensate for the subsequent amplifiers. According to an advantageous characteristic of the invention, the CPA chain is slaved so as to maximize the spectrum of the output pulses from the chain. This slaving is carried out through a spectral measurement at the output of the amplifiers and a feedback to the acousto-optical crystal.

Figure 1:
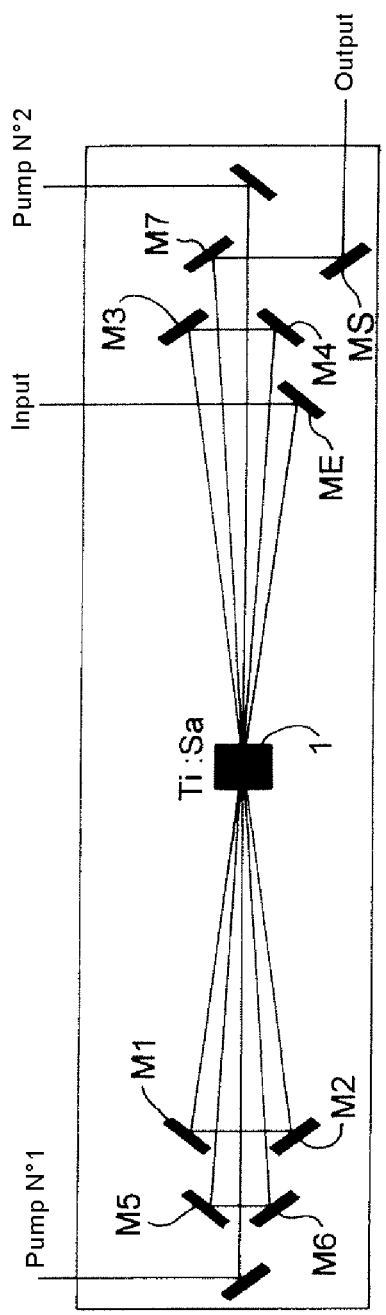
FIGS. 1 to 4, already mentioned above, are respectively diagrams of multi-pass and regenerative amplifiers of the prior art, a curve of the evolution of the gain of a Ti:Sa crystal as a function of wavelength and a set of curves of the evolution of the gain of a regenerative amplifier for various numbers of passes of the input signal.
Figure 2:
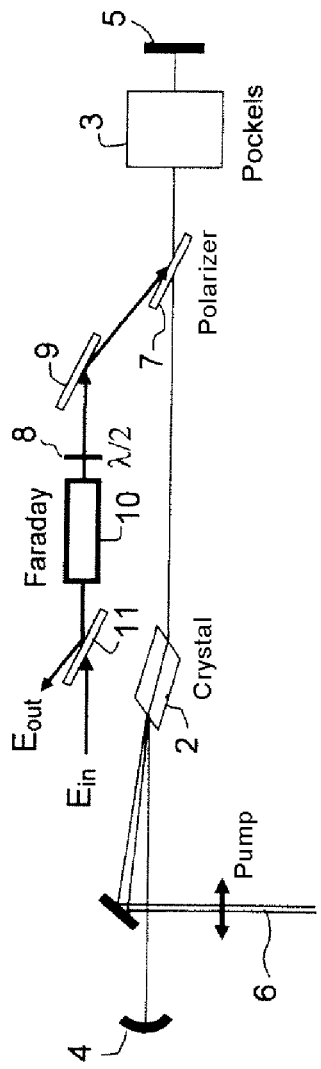
Figure 3:
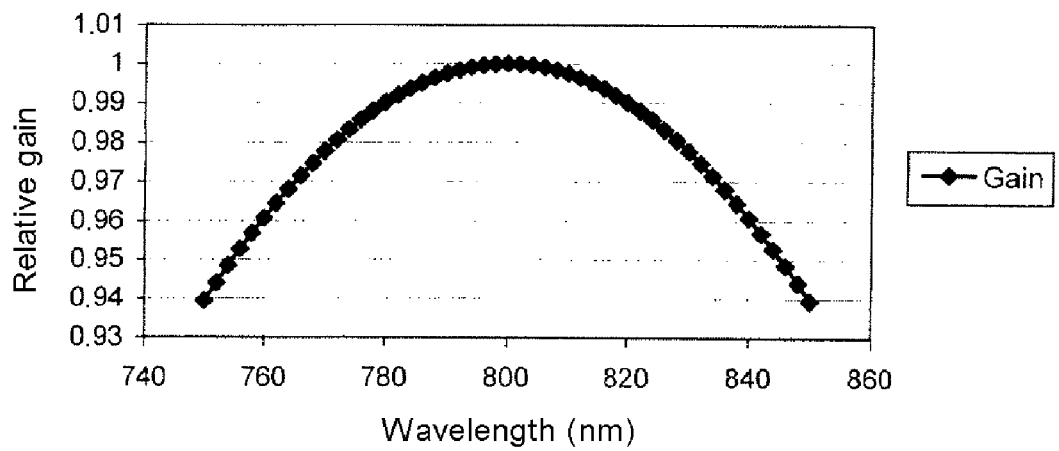
Figure 4:
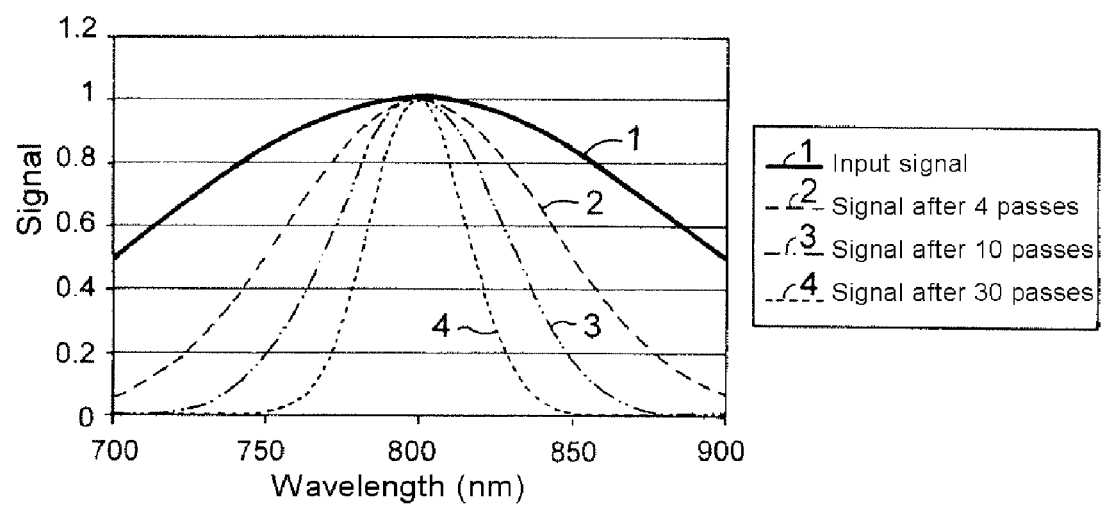
Figure 6:
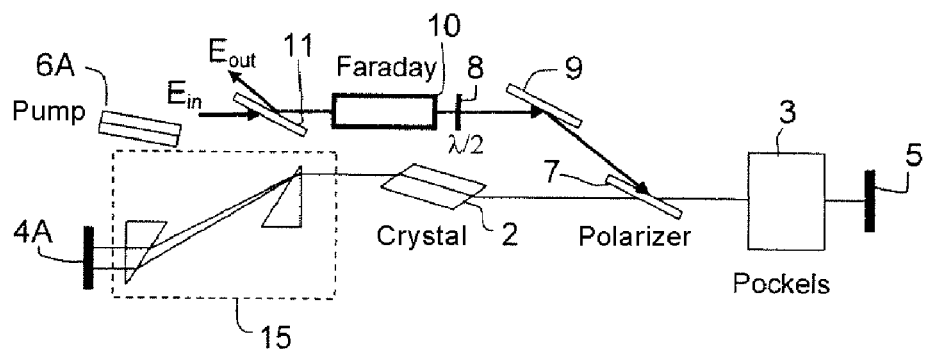
FIG. 6 is a block diagram of a regenerative amplifier in accordance with the invention.

The basic diagram of a regenerative amplifier including an electro-optical spectral stretching and compensation device in accordance with the invention has been represented in FIG. 6. The elements similar to those of FIG. 2 are assigned like numerical references. The essential difference of the device of FIG. 6 with respect to that of FIG. 2 resides in the insertion of an electro-optical spectral stretching and compensation device 15. This device 15 being known per se according to the above-mentioned French patent application, will not be described in detail. This device 15 is inserted for example between the crystal 2 and the cavity plane mirror 4A (which here replaces the concave mirror 4 of FIG. 2).

The duration of the pulse output from the regenerative amplifier (beam $E_{out}$) is now compatible with higher amplification levels obtained for example with a series of multi-pass amplifiers. It is thus possible to obtain pulses of several hundred mJ possessing a spectrum close to that of the injected pulse.

Figure 5:
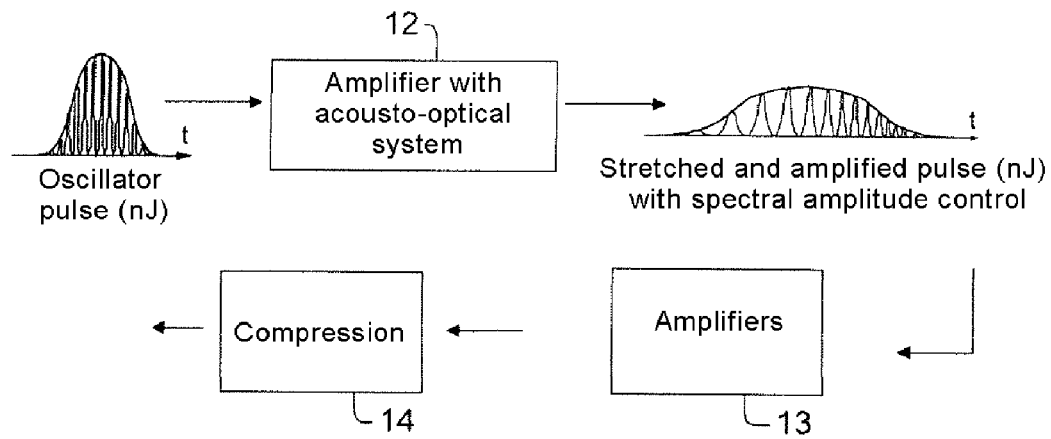
FIG. 5 is a block diagram of a CPA chain in accordance with the invention.
Figure 7:
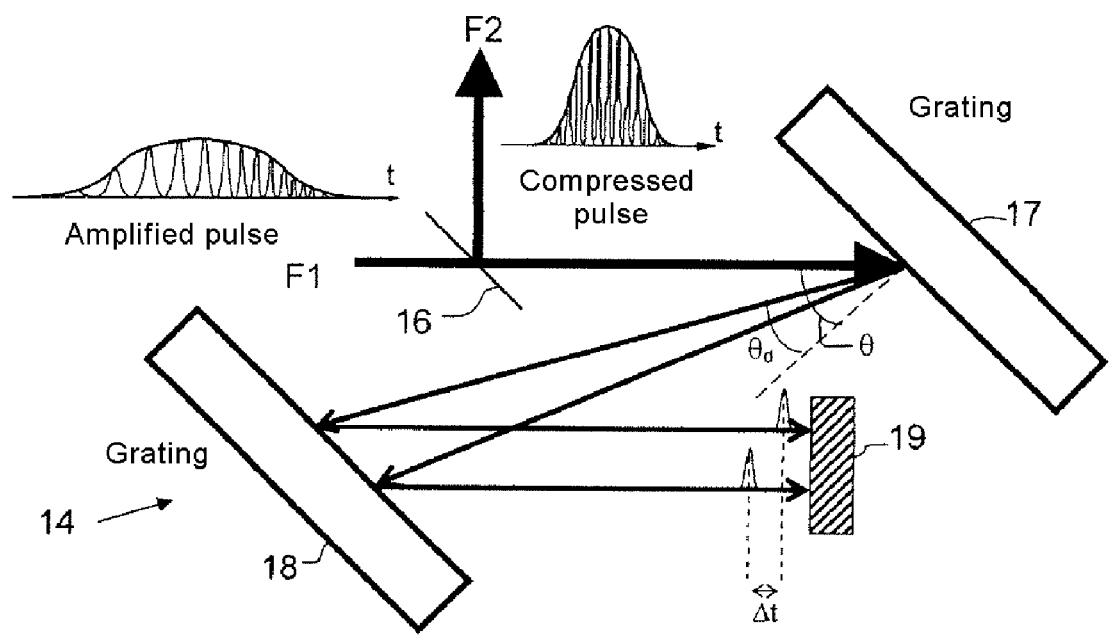
FIG. 7 is a block diagram of a compressor with gratings which it is possible to use in the device of the invention.

To recompress these amplified pulses, it suffices to use a conventional compressor with gratings (compressor 14 of FIG. 5). The use for example of gratings with 1200 l/mm makes it possible to obtain good results. The block diagram of such a compressor 14 has been represented in FIG. 7. The beam F1 of amplified pulses is dispatched, via a semi-transparent mirror 16, at an angle of incidence differing from the normal, onto a first dispersive grating 17, which reflects it onto a second grating 18, similar to the first and parallel to the latter. The second grating 18 reflects its incident beam, at normal incidence, onto a plane mirror 19. This mirror sends the beam back along the same path to the mirror 16 which reflects it towards the output (beam F2).

The device of the invention makes it possible to dispense with the stretcher system as well as the spectral filtering that are generally used at the input of the amplifying chains. It makes it possible to obtain stretching rates compatible with high-energy amplification while being much more compact and simpler than an Öffner stretcher.

The spectral compensation being done at each pass through the acousto-optical device, it is possible to compensate, without losses, for the spectral constriction occurring in the amplifiers.

The device of the invention is applicable to any laser material, and for example titanium-doped sapphire. The system operates in an ideal manner with a regenerative amplifier, since the significant number of return trips makes it possible to obtain stretched durations of several hundred ps. This duration is moreover controllable via the number of return trips.

The invention also operates in the case of a multi-pass amplifier. However, the lesser number of passes (<10) limits the stretched duration. This configuration can be ideal for a system delivering little energy, as is the case for example at 10 kHz. It also makes it possible to attain shorter durations while maintaining a wide spectrum during the successive amplification phases, doing so without greatly impairing the efficiency of the laser. It is therefore an economic alternative to the traditional stretcher+spectral filter systems.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A high peak power paulse laser including a CPA-type amplifier chain, said pulse laser comprising:
    a pulse laser oscillator emitting pulses,
    a plurality of multi-pass amplifiers amplifying the pulses, one of the amplifiers including an acousto-optical device dispersing the pulses and modulating a spectral amplitude of an optical wave;
    wherein
    said acousto-optical device includes a stretching device stretching the pulses and a compensation device compensating the spectral constriction of the amplifiers; and
    said acousto-optical device is arranged between mirrors in an optical cavity of the multi-pass amplifier.

2. The high peak power pulse laser as claimed in claim 1, wherein the multi-pass amplifier that includes the acousto-optical device is a regenerative type.

3. The high peak power pulse laser as claimed in claim 1, wherein
    said stretching device of said acousto-optical device comprises at least one prism that is an Acousto-Optical crystal.

4. The high peak power pulse laser as claimed in claim 1, wherein
    the CPA-type amplifier chain includes means for measuring spectral at an output of the multi-pass amplifiers; and
    the acousto-optical device includes a feedback loop.

5. The high peak power pulse laser as claimed in claim 1, wherein said stretching device is arranged in the optical cavity.

6. The high peak power pulse laser as claimed in claim 5, wherein said amplifier includes a Ti:Sa laser crystal arranged between the mirrors.

* * * * *